United States Patent
Dean, Jr. et al.

(10) Patent No.: US 7,527,435 B2
(45) Date of Patent: May 5, 2009

(54) RIGHT-ANGLE OPTICAL FIBER CONNECTOR ASSEMBLY

(75) Inventors: David Lee Dean, Jr., Hickory, NC (US); Dennis Michael Knecht, Hickory, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/729,573

(22) Filed: Mar. 29, 2007

(65) Prior Publication Data

US 2008/0240657 A1 Oct. 2, 2008

(51) Int. Cl.
*G02B 6/36* (2006.01)
(52) U.S. Cl. .......................................... 385/78; 385/89
(58) Field of Classification Search .................... None
See application file for complete search history.

(56) References Cited

U.S. PATENT DOCUMENTS

| | | | | |
|---|---|---|---|---|
| 5,260,957 | A | 11/1993 | Hakimi et al. | 372/39 |
| 5,375,183 | A * | 12/1994 | Edwards et al. | 385/60 |
| 5,640,476 | A * | 6/1997 | Womack et al. | 385/86 |
| 5,881,200 | A | 3/1999 | Burt | 385/142 |
| 6,402,389 | B1 * | 6/2002 | Steijer et al. | 385/65 |
| 6,577,801 | B2 | 6/2003 | Broderick et al. | 385/125 |
| 6,594,435 | B2 * | 7/2003 | Tourne | 385/136 |
| 6,710,366 | B1 | 3/2004 | Lee et al. | 257/14 |
| 6,742,936 | B1 * | 6/2004 | Knecht et al. | 385/67 |
| 6,856,742 | B2 * | 2/2005 | Broeng et al. | 385/125 |
| 6,968,107 | B2 | 11/2005 | Belardi et al. | 385/127 |
| 7,025,508 | B2 * | 4/2006 | Kopf et al. | 385/77 |
| 7,054,513 | B2 | 5/2006 | Herz et al. | 385/12 |
| 7,162,124 | B1 | 1/2007 | Gunn, III et al. | 385/37 |
| 2003/0091290 | A1 | 5/2003 | Whitehead | 385/50 |
| 2005/0152650 | A1 | 7/2005 | Knickerbocker et al. | 385/60 |
| 2006/0115217 | A1 | 6/2006 | Childers et al. | 385/53 |
| 2006/0269192 | A1 | 11/2006 | Hayasaka | 385/60 |

(Continued)

OTHER PUBLICATIONS

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

(Continued)

*Primary Examiner*—Omar Rojas
(74) *Attorney, Agent, or Firm*—C. Keith Montgomery (57) ABSTRACT

A right-angle optical-fiber connector assembly for providing an optical connection to an external device such as a circuit board. The connector assembly includes a rigid ferrule having at least one right-angle bend and that defines an interior region and first and second ferrule ends, and a maximum optical fiber bending radius $R_{MAX}$. One or more bend-performance optical fibers traverse the interior region. Each optical fiber has an associated minimum bending radius $R_{MIN}$ and includes a bending radius $R_F$ such that $R_{MIN} \leq R_F \leq R_{MAX}$, wherein at least one of the one or more optical fibers has $R_F = R_{MIN}$. The first and second connector ends are respectively located at or near the first and second ferrule ends and operably support the first and second optical fiber ends. The connector ends are each adapted to provide an external optical interconnection to an external device such as a circuit board.

14 Claims, 11 Drawing Sheets

U.S. PATENT DOCUMENTS

2007/0086723 A1    4/2007    Sasaki et al.    ........... 385/137

OTHER PUBLICATIONS

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

* cited by examiner

RIGHT-ANGLE OPTICAL FIBER CONNECTOR ASSEMBLY

BACKGROUND OF THE INVENTION

1. Field of the Invention

The present invention relates generally to optical fiber connectors, and particularly to an optical-fiber connector assembly that has at least one right-angle.

2. Technical Background

Optical fiber connectors are used in a variety of applications where a set of one or more optical fibers needs to be connected to an external device, such as another set of one or more optical fibers, a circuit board, or an apparatus adapted to receive and transmit light. For example, optical fiber cables require connectors adapted to connect to and link discrete segments of optical fibers.

Certain optical and electrical-optical devices have circuit boards that need to be interfaced with one or more optical fibers so that optical signals can be received and processed by the device, and also transmitted from the device to another device or to a back plane. This often requires plug-in or receptacle optical connectors analogous to plug-in and receptacle electrical connectors used for electrical circuit-board components. Alternatively, such an interface may be accomplished with a connector end adapted to be permanently (or semi-permanently) fixed to the circuit board to establish and maintain optical communication with corresponding devices (e.g., photodetector or phototransmitters) on the circuit board. Because interior space is typically at a premium for most optical and electrical-optical devices, the optical connectors are preferably compact so that they can fit into tight spaces when connecting to a circuit board housed within the device. The fact that space is also at a premium on the circuit board makes establishing the circuit-board optical interconnection even more challenging.

Unfortunately, most optical fiber connectors and the optical fibers connected thereto do not allow for readily accessing and connecting to a circuit board housed in the tight confines of most optical and electro-optical devices because it requires introducing significant bending loss in the optical fibers. Accordingly, what is needed is an optical fiber connector assembly that has at least one right-angle and that is not susceptible to a significant bending loss when trying to connect to an external device housed in cramped quarters.

SUMMARY OF THE INVENTION

One aspect of the invention is a right-angle optical-fiber connector assembly. The assembly includes a rigid ferrule having at least one right-angle bend and that defines a ferrule interior and that includes first and second ferrule ends. The assembly also includes one or more bend-performance optical fibers that traverse the ferrule interior and that have respective first and second optical fiber ends, a bending radius $R_F$ and a minimum bending radius $R_{MIN}$, wherein $R_{MIN} \leq R_F \leq R_{MAX}$, wherein $R_{MAX}$ is the maximum fiber bending radius allowed by the ferrule interior. At least one of the one or more optical fibers has $R_F = R_{MIN}$. The assembly further includes first and second connector ends respectively located at or near the first and second ferrule ends. The first and second connector ends respectively operably support the first and second optical fiber ends to provide external optical interconnection capability.

Another aspect of the invention is a method of forming a right-angle connector assembly. The method includes providing a rigid ferrule having at least one right-angle bend, a ferrule interior, and first and second ferrule ends. The method also includes arranging one or more bend-performance optical fibers having respective first and second optical fiber ends so as to traverse the ferrule interior. Each optical fiber has first and second optical fiber ends, a bending radius $R_F$ and a minimum bending radius $R_{MIN}$, wherein $R_{MIN} \leq R_F \leq R_{MAX}$. At least one of the one or more optical fibers has $R_F = R_{MIN}$. The method also includes forming first and second connector ends respectively located at or near the first and second ferrule ends and that respectively operably support the first and second optical fiber ends to provide external optical interconnection capability.

Another aspect of the invention is a right-angle optical-fiber connector assembly for connecting to a circuit board. The assembly includes a rigid ferrule having first and second ferrule ends, a ferrule interior, and at least one right-angle bend. The assembly also includes one or more bend-performance optical fibers. The optical fibers traverse the ferrule interior and have respective first and second optical fiber ends, a bending radius $R_F$ and a minimum bending radius $R_{MIN}$. The optical fibers satisfy the condition $R_{MIN} \leq F \leq R_{MAX}$, wherein at least one of the one or more optical fibers has $R_F = R_{MIN}$. The assembly further includes first and second connector ends respectively located at or near the first and second ferrule ends and that respectively operably support the first and second optical fiber ends, wherein at least one of the connector ends is adapted to optically connect to the circuit board.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

X-Y-Z Cartesian coordinates are provided in some of the Figures for the sake of reference.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numbers are to be used throughout the drawings to refer to the same or like parts.

Figure 1:
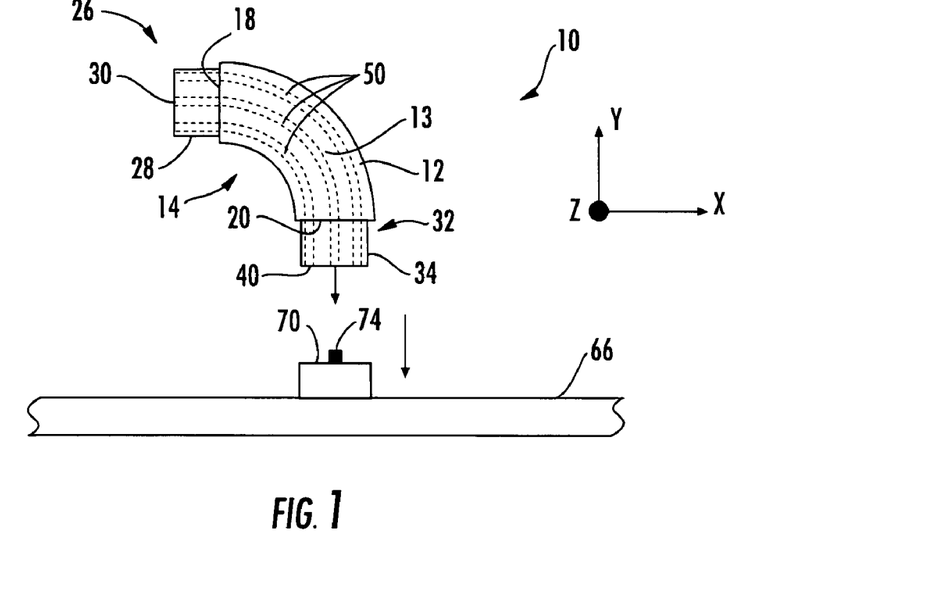
FIG. 1 is a schematic side view of a first example embodiment of a right-angle optical-fiber connector assembly according to the present invention, along with a circuit board as an example of an external device to which the assembly can be connected.
Figure 2:
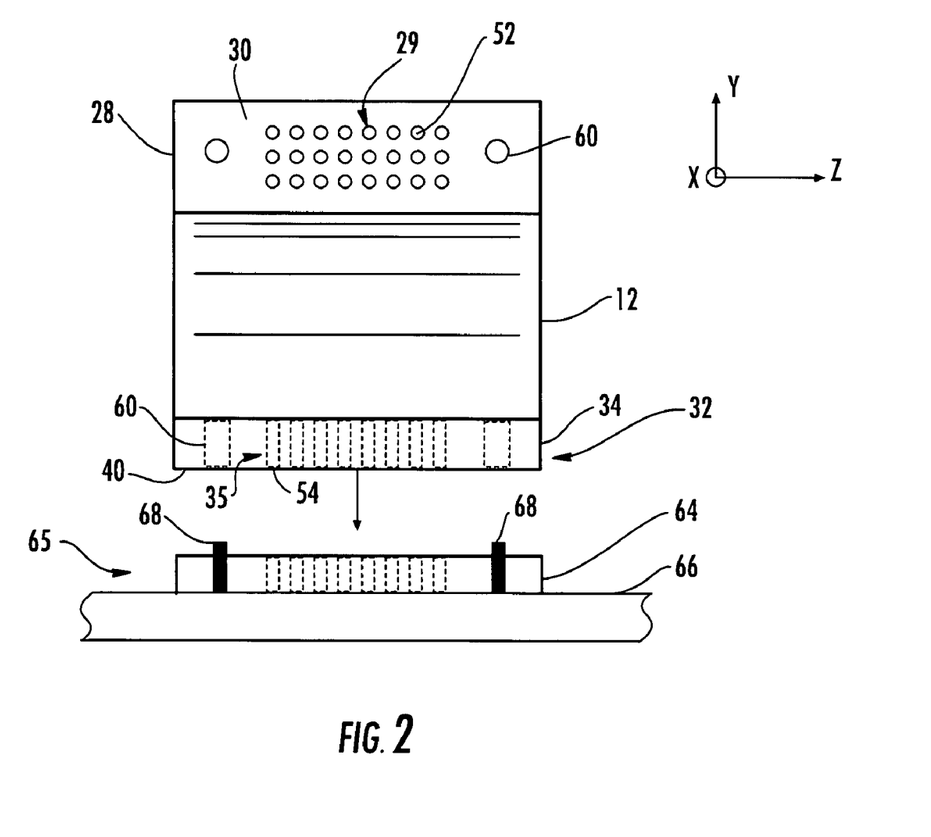
FIG. 2 is a front-on view of the right-angle connector assembly and circuit board of FIG. 1 as viewed looking in the X-direction.

FIG. 1 is a schematic side view of a first example embodiment of a right-angle optical-fiber connector assembly ("right-angle connector assembly") 10 according to the present invention. FIG. 2 is a front-on view of the right-angle connector assembly of FIG. 1 looking in the X-direction. Right-angle connector assembly 10 includes a rigid right-angle ferrule 12 that defines a ferrule interior 13. Right-angle ferrule 12 also includes at least one right-angle bend 14. In the present invention, bend 14 is referred to hereinafter as a "right-angle bend" because it causes connector ends 30 and 40 to lie in perpendicular planes (namely, the Y-Z plane and X-Z plane, respectively). Right-angle bend 14 is shown as having a curvature, though a sharp-corner bend is also possible, as described below. Right-angle ferrule 12 is thus referred to hereinafter as a "right-angle ferrule," regardless of the number of right-angle bends it has. Right-angle ferrule 12 also includes first and second opposite ends 18 and 20.

In an example embodiment, right-angle connector assembly 10 includes respective connectors 26 and 32 attached to or formed at respective right-angle ferrule ends 18 and 20. In an example embodiment, connectors 26 and 32 have respective connector housings 28 and 34 that define respective connector ends 30 and 40. Each connector end 30 and 40 is adapted to provide external optical interconnection capability, including free-space interconnection capability. In an example embodiment, one or both connector ends 30 and 40 define either a plug or receptacle. FIG. 2 Illustrates connector ends 30 and 40 in the form of plugs for the sake of illustration. In an example embodiment, such as discussed in connection with FIGS. 7 and 8 below, at least one connector end 30 and 40 is formed at respective ferrule ends 18 and 20 rather than via a connector housing. This allows for the direct connection of the right-tangle connector assembly to a circuit board without the need for the circuit board to have a mating connector.

In an example embodiment, each connector housing 28 and 34 is solid and includes respective first and second optical fiber bores 29 and 35 formed therein and sized to retain individual optical fibers. Right-angle connector assembly 10 further includes one or more bend-performance optical fibers 50, which are described in more detail below. The one or more optical fibers 50 traverse ferrule interior 13 and have opposite first and second ends 52 and 54.

Figure 3:
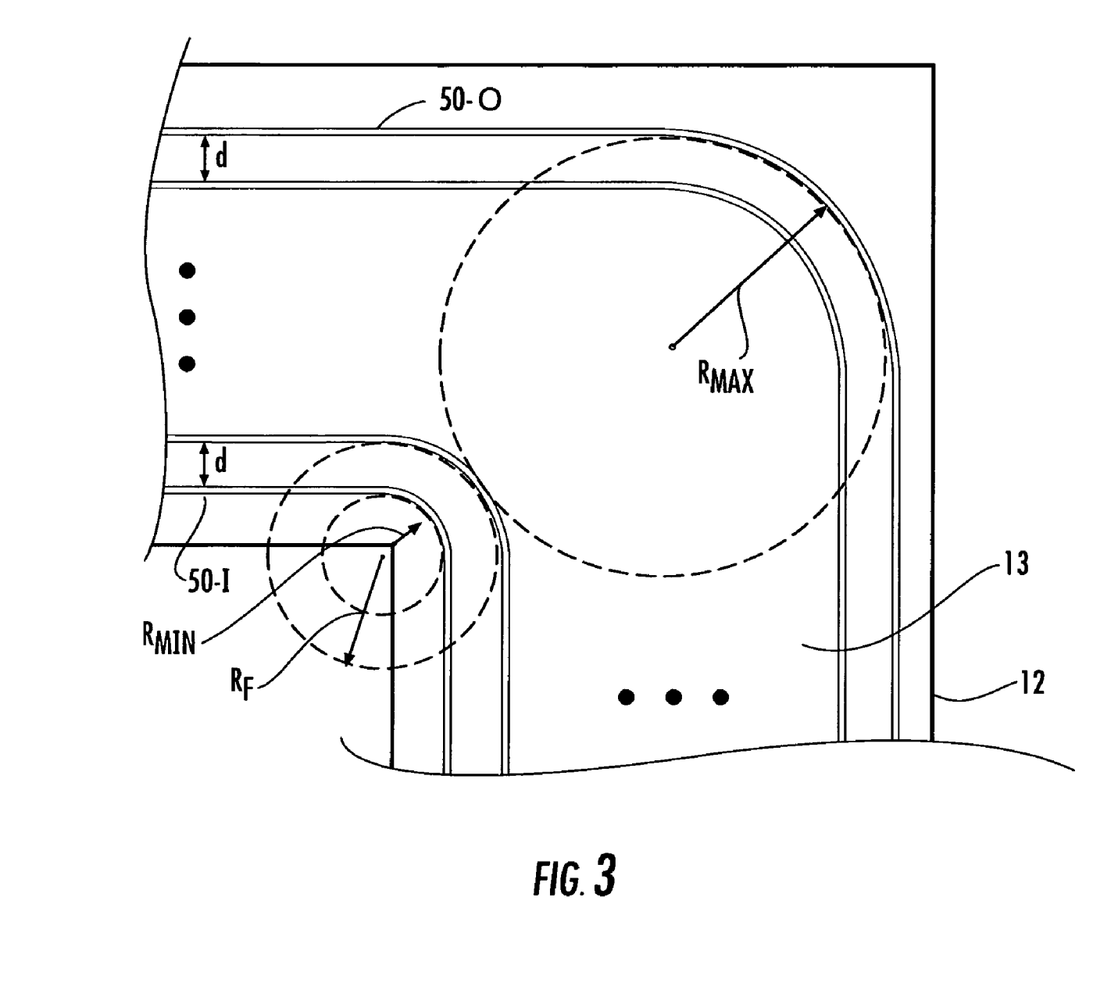
FIG. 3 is a close-up cross-sectional view of the optical fibers traversing ferrule interior 13, illustrating the different possible bending radii of the optical fibers contained in the ferrule interior.

FIG. 3 is a close-up cross-sectional view of optical fibers 50 traversing ferrule interior 13, illustrating the different bending radii of the optical fibers. Optical fibers 50 are equispaced a distance d apart. Note that the dimensions of ferrule interior 13 and the particular arrangement of optical fibers 50 contained therein define a maximum allowable bending radius $R_{MAX}$ for an optical fiber 50. In the example embodiment shown in FIG. 3, each optical fiber 50 has a progressively larger bending radius $R_F$, from a minimum bending radius $R_{MIN}$ for the innermost optical fiber 50-I to the maximum bending radius $R_{MAX}$ for the outermost optical fiber 50-O. In an alternate example embodiment illustrated in FIG. 4, all optical fibers 50 have a bending radius $R_F = R_{MIN}$.

Though right-angle ferrule 12 includes at least one right-angle bend 14 that supports, in principle, a minimum bending radius of 90° degrees, the one or more optical fibers 50 contained therein need not, and in fact should not, have such a sharp angle. Rather, each optical fiber 50 has a relatively strong bend $R_F$ that can approach or be equal to the fiber's minimum bending radius $R_{MIN}$. Thus, in an example embodiment, $R_{MIN} \leq R_F \leq R_{MAX}$, wherein at least one of the optical fibers has $R_F$ equal to or substantially equal to $R_{MIN}$.

Figure 4:
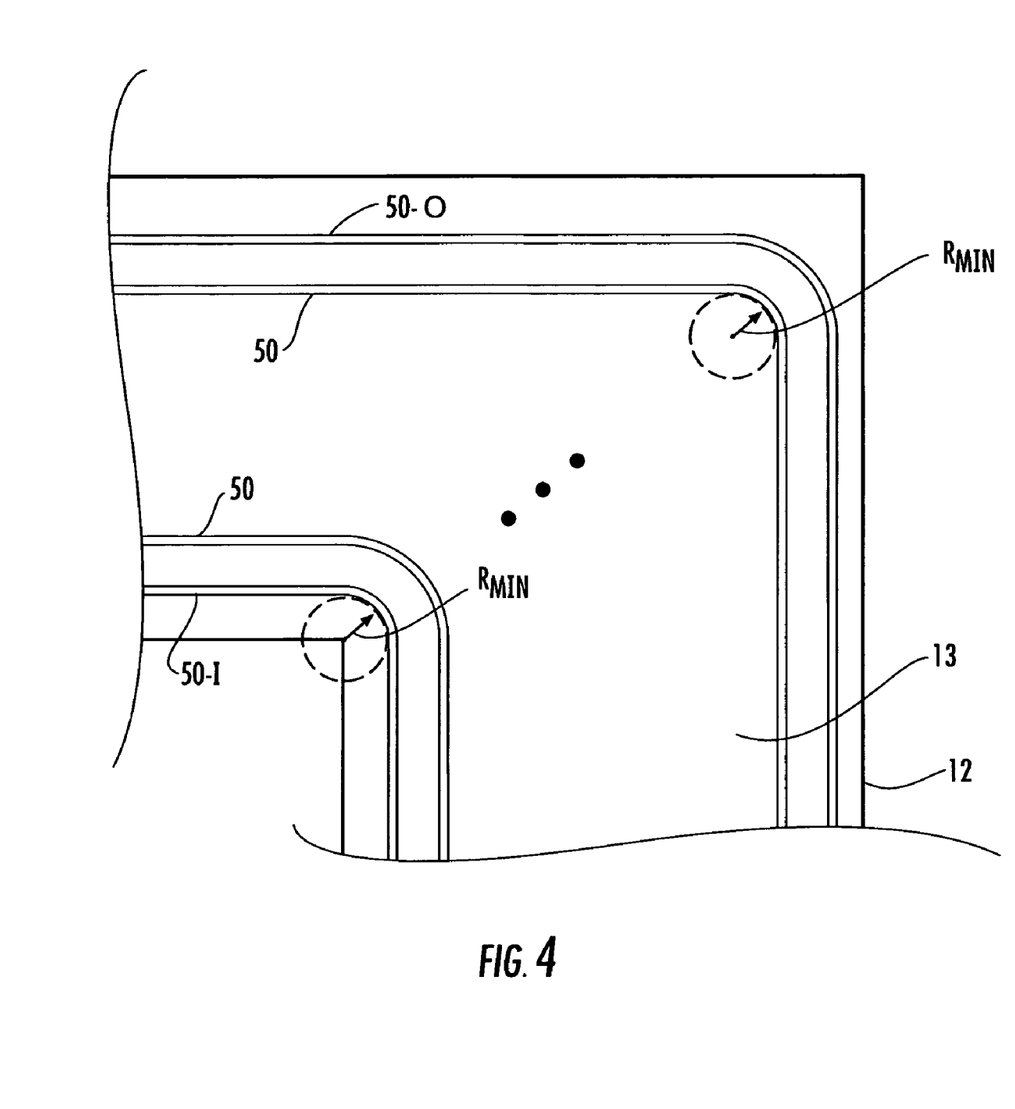
FIG. 4 is similar to FIG. 3, but showing an example embodiment wherein all of the optical fibers contained in the ferrule interior have a bending radius $R_F$ equal to the minimum bending radius $R_{MIN}$.

In an example embodiment, optical fiber 40 has a minimum bending radius $R_{MIN}$=4 mm for substantially no bending loss, and $R_{MIN} \approx 2$ mm for ~1 dB bending loss. Also in an example embodiment, $R_{MAX} \approx 250$ mm (i.e., about 1 inch). In an example embodiment each optical fiber 50 has a bending radius $R_F$ equal to or substantially equal to $R_{MIN}$ as illustrated in FIG. 4.

Because bend-performance optical fibers 50 have very little bending loss even in the face of extreme bending, each optical fiber 50 can be bent to substantially conform to the otherwise severe right-angle bend 14 in ferrule 12 without incurring substantial bending loss. The use of bend-performance optical fibers 50 allows connector assembly 10 to be made compact.

Figure 5:
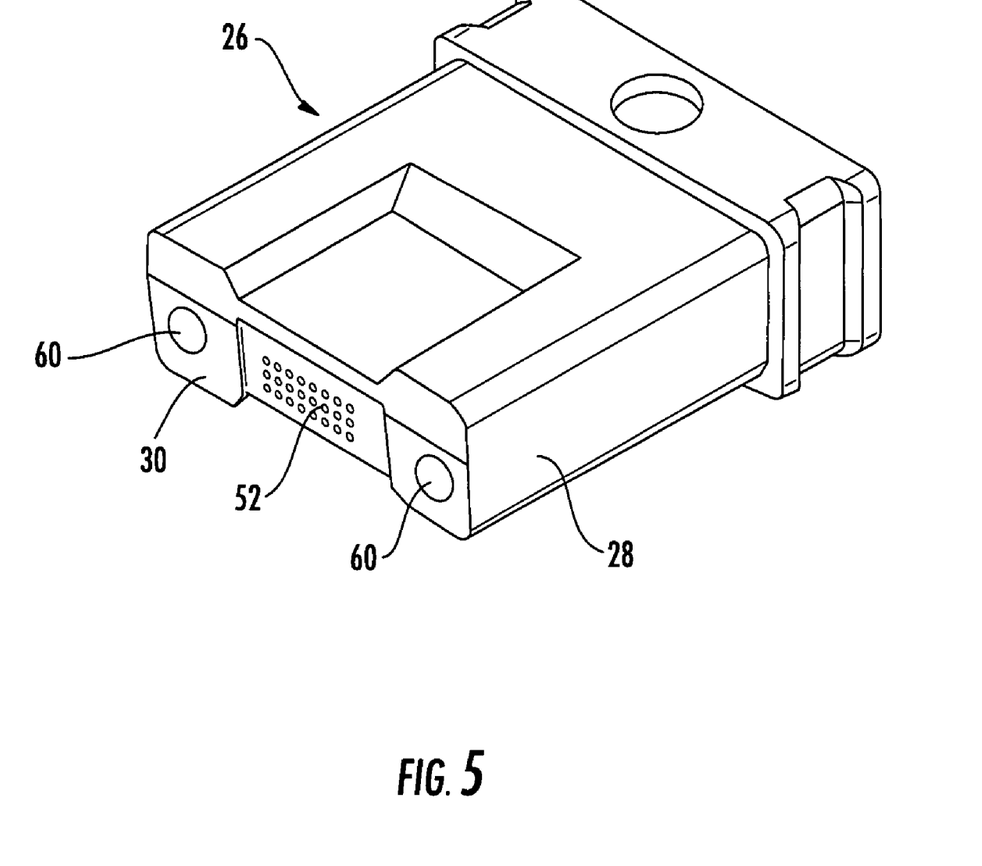
FIG. 5 is a perspective view of an example connector that can be used to form one or both connector ends of the right-angle connector assembly.

FIG. 5 is perspective view of an example connector that can also be used as either or both connectors 26 and 32. With reference to FIGS. 2 and 5, the one or more optical fiber first ends 52 are retained by corresponding one or more bores 29 formed in the otherwise solid first connector housing 28. Fiber first ends 52 terminate at connector end 30 of first connector housing 28. The one or more optical fiber second ends 54 are retained by a corresponding bore 35 formed in the otherwise solid second connector housing 34. Second fiber ends 54 terminate at connector end 40 of second connector housing 34. Bores 29 and 35 are preferably formed so that their central axes are perpendicular to respective connector ends 30 and 40.

In an example embodiment, each connector housing 28 and 34 includes a retention feature, such as guide pins or guide-pin holes. The example connector housings 28 and 34 of FIGS. 2 and 5 are shown by way of example to each include a retention feature that includes a pair of guide-pin holes 60 that extend directly outward from corresponding connector ends 30 and 40. Guide-pin holes 60 are used to align each connector housing to a mating connector housing of an external device, e.g., a connector housing 64 of a connector 65 on a circuit board 66. Circuit-board mating connector housing 64 includes guide pins 68 arranged and sized to engage guide-pin holes 60 so that the particular connector (e.g., connector 32 as shown in FIG. 2) is properly aligned with circuit board mating connector 65. Right-angle connector assembly 10 can be constructed to include connectors 26 and 32 of any of the known types of optical fiber connectors, including but not limited to FC, SC, LC, ST, MU and MTP types of connectors.

Figure 6:
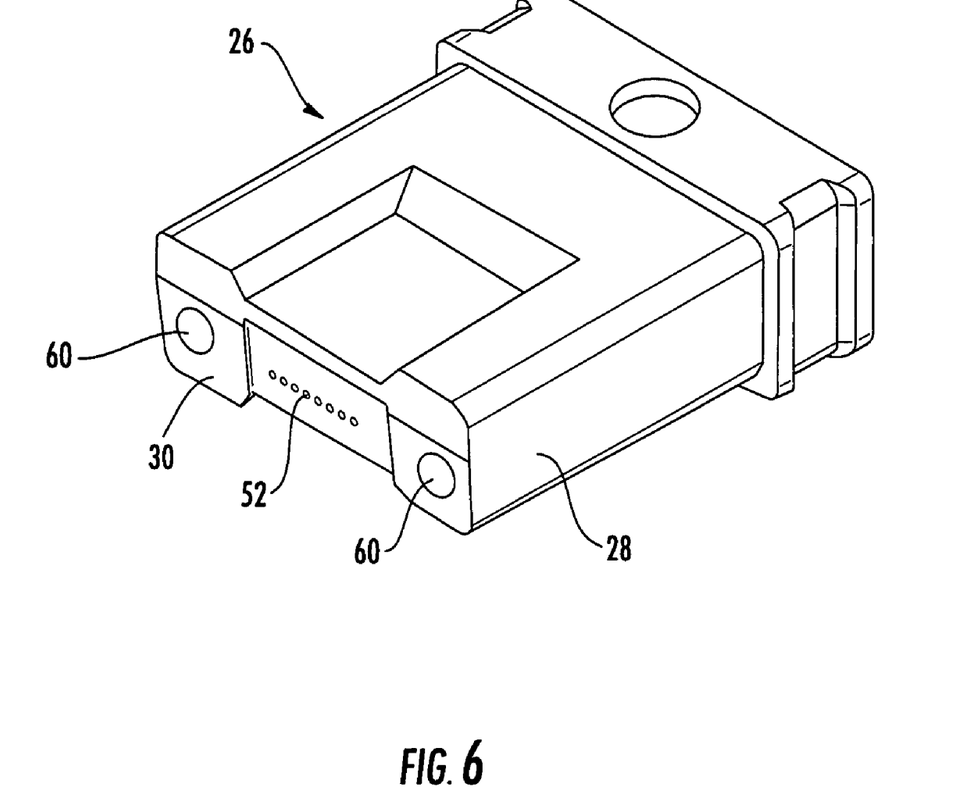
FIG. 6 is a perspective view of an example connector similar to that of FIG. 5, but that includes a single row of optical fibers.

The right-angle connector assembly 10 of FIGS. 1, 2 and 5 illustrate an example embodiment that includes multiple fibers arranged in multiple rows at connector ends 30 and 40. FIG. 6 illustrates an example embodiment of right-angle connector assembly 10 that Includes multiple fiber ends 52 arranged in a single row at connector ends 30 and 40.

Figure 7:
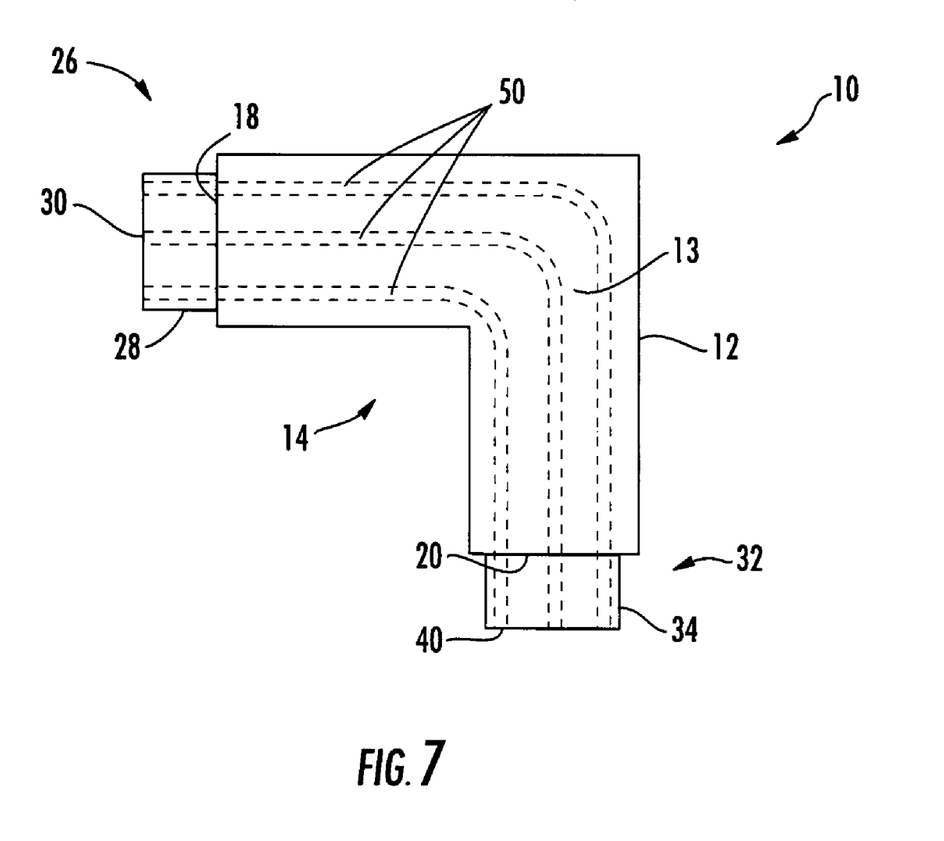
FIG. 7 is a schematic side view of an example right-angle connector assembly similar to that of FIG. 1, wherein the right-angle ferrule includes a sharper right-angle bend than that of FIG. 1.

FIG. 7 is a schematic side view of an example right-angle connector assembly 10 similar to that of FIG. 1, wherein right-angle ferrule 12 includes sharper bend 14 as compared to that shown in FIG. 1. Likewise, the one or more optical fibers 50 that traverse ferrule interior 13 can have a sharper bend that more closely approaches a right-angle, albeit only up to the point where bending loss remains insubstantial, i.e., up to maximum bending radius $R_{MAX}$, as described above.

Figure 8:
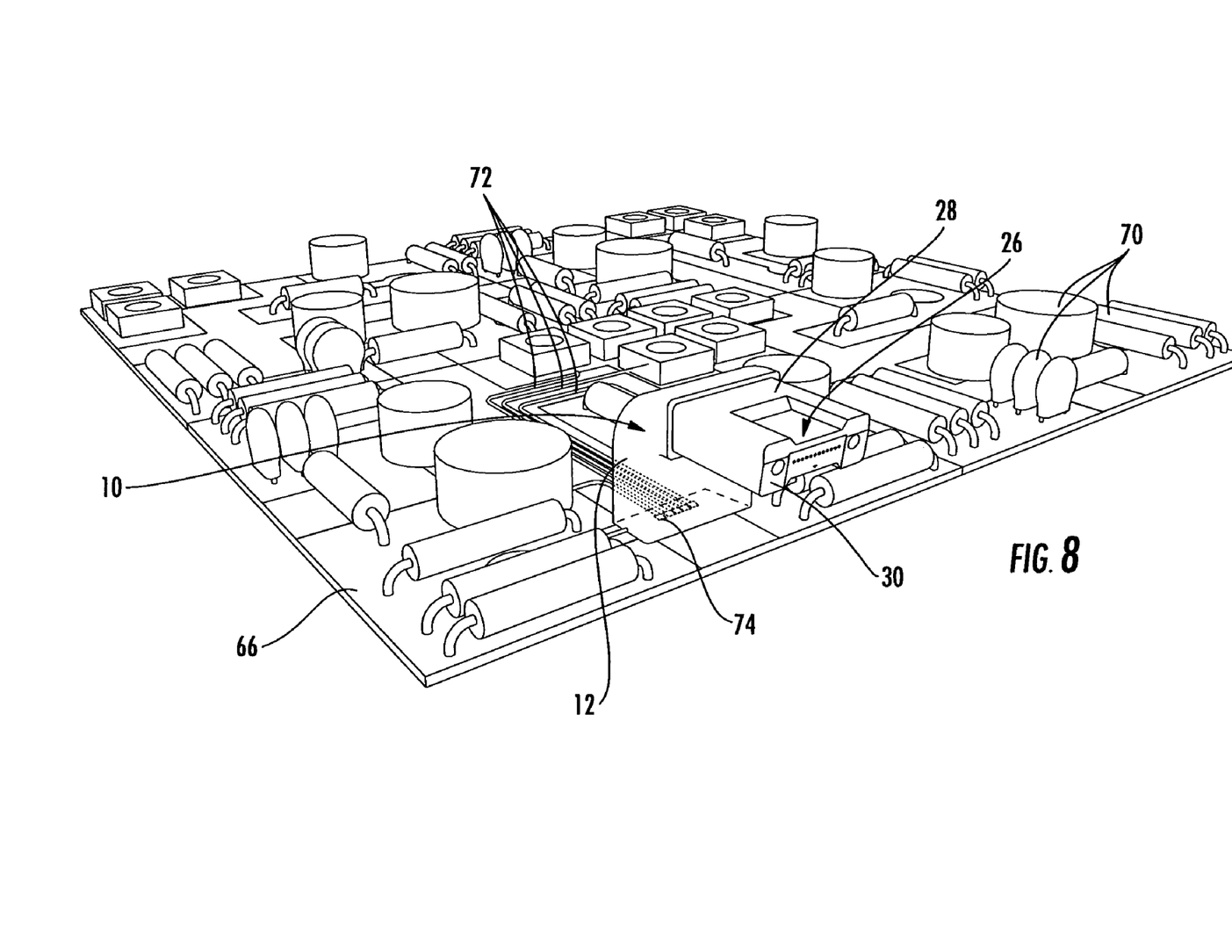
FIG. 8 is a perspective plan view of an example embodiment of the right-angle connector assembly of the present invention as connected to an external device in the form of a circuit board, illustrating photodetectors on the circuit board that convert optical signals carried by the optical fibers to electrical signals carried by wire interconnections on the circuit board.
Figure 9:
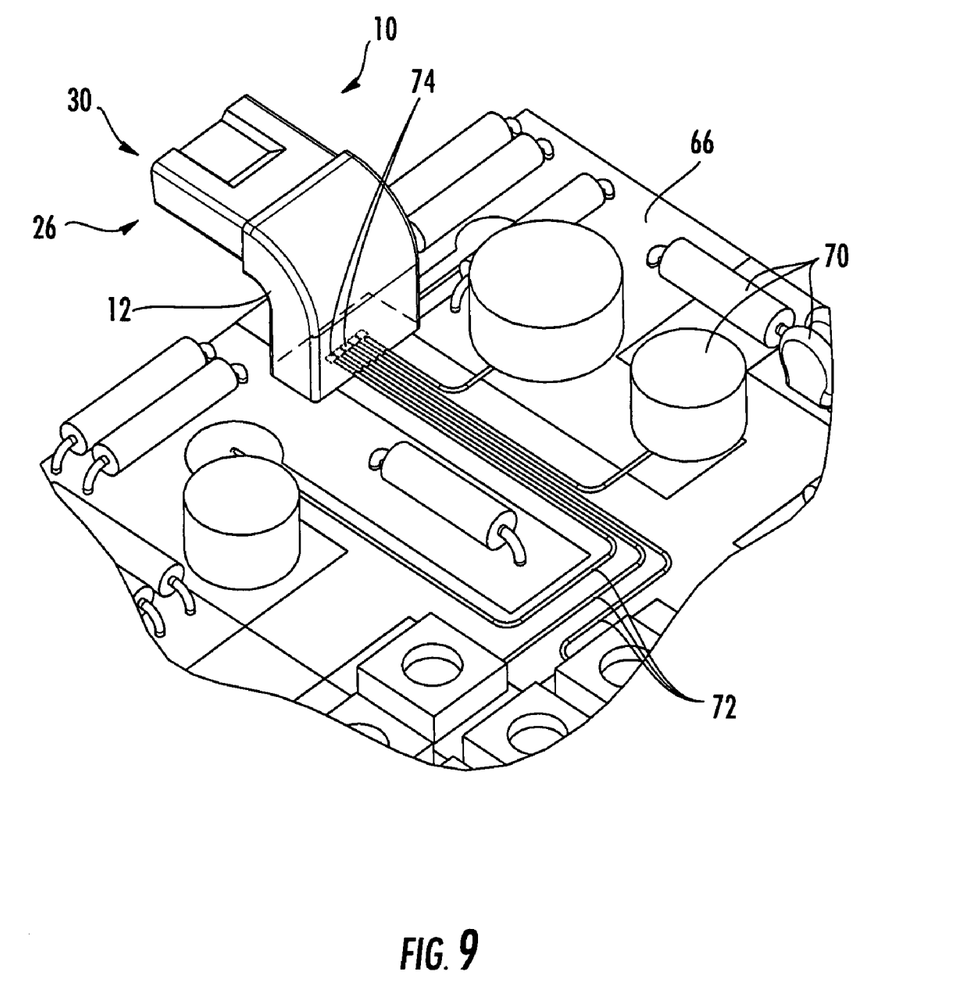
FIG. 9 is a close-up perspective plan view of the right-angle connector and circuit board similar to that of FIG. 8 as taken from another direction that more clearly shows the wire interconnections on the circuit board.

FIG. 8 is a perspective view of right-angle connector assembly 10 of the present invention shown connected to a circuit board 66. FIG. 9 is a close-up perspective plan view of the right-angle connector assembly 10 and circuit board 66 of FIG. 8 as taken from another direction. Circuit board 66 includes a number of circuit elements 70 (e.g., resistors, capacitors, transistors, etc.), as well as a number of operably arranged interconnect wires 72. Right-angle connector assembly 10 of FIGS. 8 and 9 illustrates an example embodiment of the invention that only includes one connector 26 of the type described above, while the other end of the right-angle connector assembly is mounted directly to circuit board 66.

As illustrated in FIG. 8, circuit board 66 includes a number (e.g., five, as shown) photodetectors 74 electrically connected to five interconnect wires 72. When right-angle connector assembly 10 is mounted directly (i.e., permanently or semi-permanently) to circuit board 66 as shown (thus obviating the need for a connector housing), photodetectors 74 are adapted to receive light carried by five corresponding optical fibers 50 contained by right-angle ferrule 12 and convert the light to respective electrical signals that travel over interconnect wires 72 to different circuit elements 70 on circuit board 66. An optical fiber cable (not shown) can then be connected to the right-angle assembly 10 at connector 26, which in the example shown includes a connector housing 28 adapted so that an optical fiber cable can be quickly attached to and detached from right-angle connector assembly 10.

Forming the Right-Angle Ferrule

Right-angle ferrule 12 of right-angle connector assembly 10 may be formed from any material sufficiently rigid to conform to the at least one optical fiber 50 to have corresponding at least one bend of radius $R_F$ that corresponds to the at least one bend 14 of the right-angle ferrule. In an example embodiment, right-angle ferrule 12 is formed from ceramic, plastic or metal. In an example embodiment, right-angle ferrule 12 is monolithic and is formed as a single unit (e.g., via extrusion) or by combining two ferrule halves (e.g., in clam-shell fashion). In an example embodiment, right-angle ferrule 12 is or includes an overmold. An overmold may be formed for example by an overmolding process that is or otherwise includes pour molding, high-pressure molding, injection molding, among others, by providing a flowable material about the one or more optical fibers 50, and substantially encapsulating the optical fibers, allowing the material to cure to define a rigid and durable ferrule about the optical fibers. In an example embodiment, the overmold process is used to establish alignment of the optical fibers as well as to provide a particular handling geometry and/or to otherwise conform the right-angle connector to a particular connector type.

In one exemplary and non-limiting molding example, the process includes: (i) arranging one or more optical fibers 50 in, for example, a cavity made by a molding tool, die or die-casting; (ii) introducing a curable material in fluid form into the cavity, the fluid essentially flooding the cavity, penetrating interstices around and about the one or more optical fiber, and essentially covering the optical fibers; and (iii) curing the curable material within suitable curing conditions. Alternative exemplary molding processes include vacuum and heat forming processes.

Also, the overmolded portion can be applied by extruding a flexible closure material while pulling the assembly through a die. A flexible cover material, for example, a paper, plastic, tubing, or tape material, may cover at least a portion of the one or more optical fibers prior to applying the molding material so that the curable material will not contact the optical fibers in the covered area. The nap portion may also include one or more pre-molded pieces that are fused or otherwise attached together (e.g., in clam-shell fashion) to form a monolithic right-angle ferrule 12. "Curable" here means thermoplastic hardening, chemical additive curing, catalyst curing including energy curing as by heat or light energy, and phase changes, among others.

In an example embodiment, right-angle ferrule 12 is made of or includes a flame retardant material. Flame-retardant right-angle ferrules can be formed by low pressure injection casting of reactive polymer liquids such as, but not limited to, polyurethanes. A typical polyurethane compound useful as an overmold compound comprises a two-part reactive mixture that can be metered together, mixed, and injected under low pressure into a mold.

Optical Fibers

Figure 10:
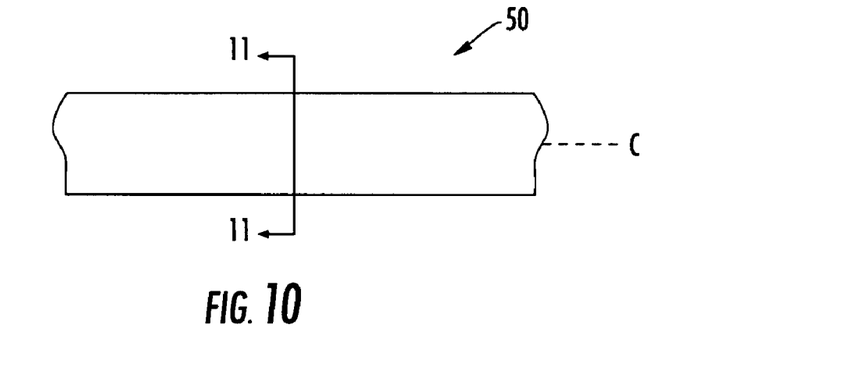
FIG. 10 is a schematic side view of a portion of a bend-performance optical fiber as used in the right-angle connector assembly of the present invention.
Figure 11:
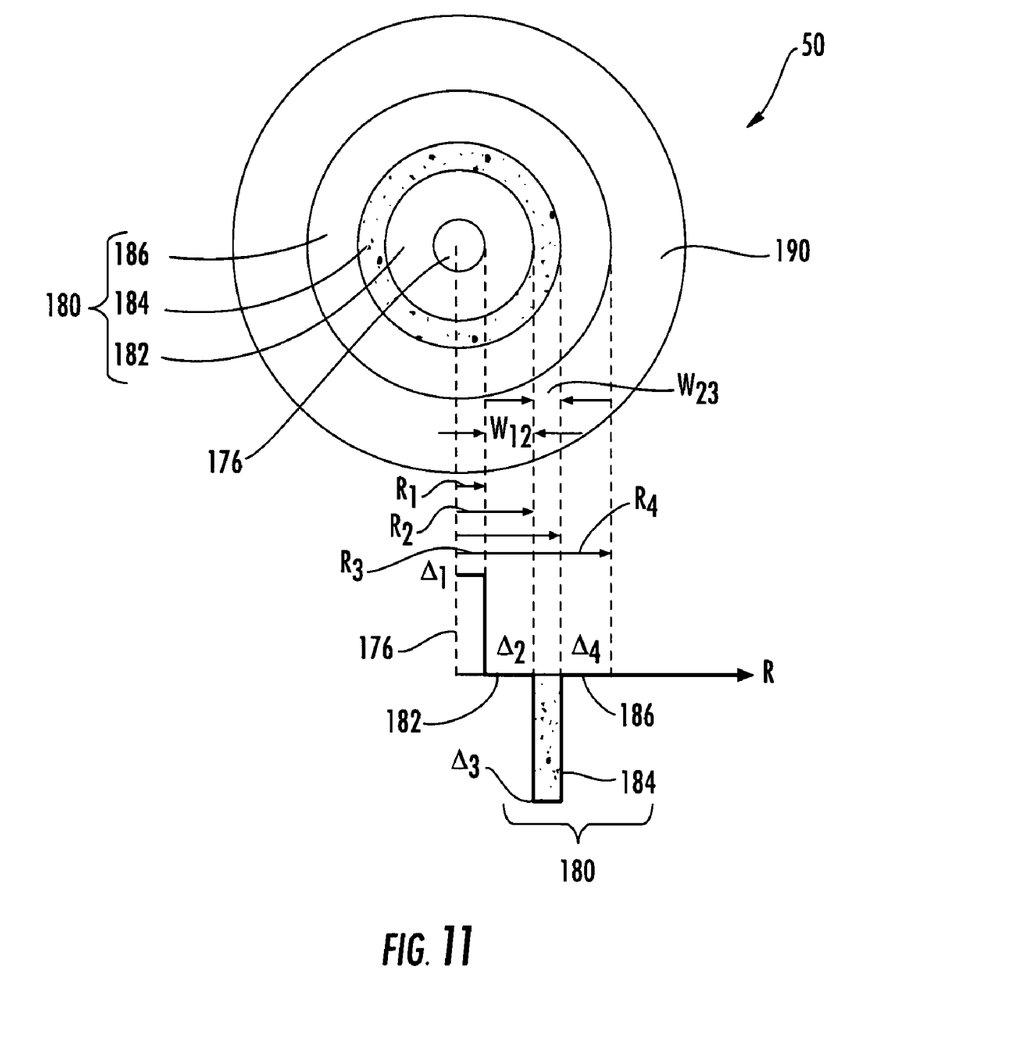
FIG. 11 is a cross-sectional view of the bend-performance optical fiber of FIG. 10 as taken along the line 11-11.

As discussed above, right-angle connector assembly 10 of the present invention includes one or more bend-performance optical fibers 50. FIG. 10 is a schematic side view of a portion of a bend-performance optical fiber 50 according to the present invention, and FIG. 11 is a cross-sectional view of optical fiber 50 taken along the line 11-11 shown in FIG. 10. Optical fiber 50 has a longitudinal centerline C. One example of a bend performance optical fiber is a microstructured optical fiber having a core region 176 disposed about centerline C, and a cladding region 180 surrounding the core region. In an example embodiment, the cladding region comprises concentric annular regions 182, 184 and 186. In an example embodiment, the cladding region 184 is an annular hole-containing region comprised of non-periodically disposed holes such that the optical fiber is capable of single-mode transmission at one or more wavelengths in one or more operating wavelength ranges. The core region and cladding regions provide improved bend resistance (as compared to conventional optical fibers).

In an example embodiment, the combination of core and cladding regions 176 and 180 result in single-mode operation at wavelengths preferably greater than or equal to 1500 nm, in some embodiments also greater than about 1310 nm, in other embodiments also greater than 1260 nm. Optical fiber 50 provides a mode field at a wavelength of 1310 nm preferably greater than 8.0 microns, more preferably between about 8.0 and 10.0 microns. In preferred embodiments, optical fiber 50 is a single-mode transmission optical fiber.

In some embodiments of the present invention, optical fiber 50 comprises core region 176 disposed about centerline C and cladding region 180 surrounding the core region, wherein the cladding region comprising an annular hole-containing region 184 comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution," it is meant that when one takes a cross-section (such as a cross-section perpendicular to centerline C) of the optical fiber, the non-periodically disposed holes are randomly or non-periodically distributed across a portion of the fiber. Cross sections similar to FIG. 11 taken at different points along the length of the optical fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 17600 nm, more preferably less than 2000 nm, and even more preferably less than 1550 nm, and most preferably less than 775 nm. In some embodiments, optical fiber 50 has fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 1800× and image analysis software, such as ImagePro, which is available from Media Cybernetics, Inc. of Silver Spring, Md., USA.

Optical fiber 50 may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region 176 includes doped silica to provide a positive refractive index relative to pure silica, e.g. germania doped silica. The core region is preferably hole-free. In some embodiments, the core region 176 comprises a single core segment having a positive maximum refractive index relative to pure silica $\Delta_1$ (in %), and the single core segment extends from the centerline C to a radius $R_1$. In one set of embodiments, $0.30\% < \Delta_1 < 0.40\%$, and $3.0 \,\mu m < R_1 < 5.0 \,\mu m$. In some embodiments, the single core segment has a refractive index profile with an alpha shape, where alpha is 6 or more, and in some embodiments alpha is 8 or more. In some embodiments, the inner annular hole-free region 182 extends from the core region to a radius $R_2$, wherein the inner annular hole-free region has a radial width $W_{12}$, equal to $R_2 - R_1$, and $W_{12}$ is greater than 1 µm. Radius $R_2$ is preferably greater than 5 µm, and more preferably greater than 6 µm. The intermediate annular hole-containing region 184 extends radially outward from $R_2$ to radius $R_3$ and has a radial width $W_{23}$, equal to $R_3 - R_2$. The outer annular region 186 extends radially outward from $R_3$ to radius $R_4$. Radius $R_4$ is the outermost radius of the silica portion of the optical fiber. One or more coatings 190 may be applied to the external surface of the silica portion of the optical fiber, starting at $R_4$, the outermost diameter or outermost periphery of the glass part of the fiber.

The core region 176 and the cladding region 180 are preferably comprised of silica. The core region is preferably silica doped with one or more dopants. Preferably, the core region is hole-free. The hole-containing region has an inner radius $R_2$ which is not more than 20 µm. In some embodiments, $R_2$ is not less than 10 µm and not greater than 20 µm. In other embodiments, $R_2$ is not less than 10 µm and not greater than 18 µm. In other embodiments, $R_2$ is not less than 10 µm and not greater than 14 µm. Again, while not being limited to any particular width, the hole-containing region 184 has a radial width $W_{23}$ which is not less than 0.5 µm. In some embodiments, $W_{23}$ is not less than 0.5 µm and not greater than 20 µm. In other embodiments, $W_{23}$ is not less than 2 µm and not greater than 12 µm. In other embodiments, $W_{23}$ is not less than 2 µm and not greater than 10 µm.

In an example embodiment, optical fiber 50 can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 db-turn, and still even more preferably less than 0.1 dB/turn.

Optical fiber 50 of some embodiments of the present invention comprises core region 176 surrounded by cladding region 180 that comprises randomly disposed voids which are contained within an annular region spaced from the core and positioned to be effective to guide light along the core region. Other optical fibers and microstructured fibers may be used in the present invention. Additional features of the microstructured optical fibers of additional embodiments of the present invention are described more fully in pending U.S. patent application Ser. No. 11/583,098 filed Oct. 18, 2006, and provisional U.S. patent application Ser. No. 60/817,1863 filed Jun. 30, 2006; 60/817,721 filed Jun. 30, 2006; 60/1841,458 filed Aug. 31, 2006; and 60/1841,490 filed Aug. 31, 2006; all of which are assigned to Corning Incorporated and the disclosures of which are incorporated by reference herein.

Z-Shaped Embodiment

Figure 12:
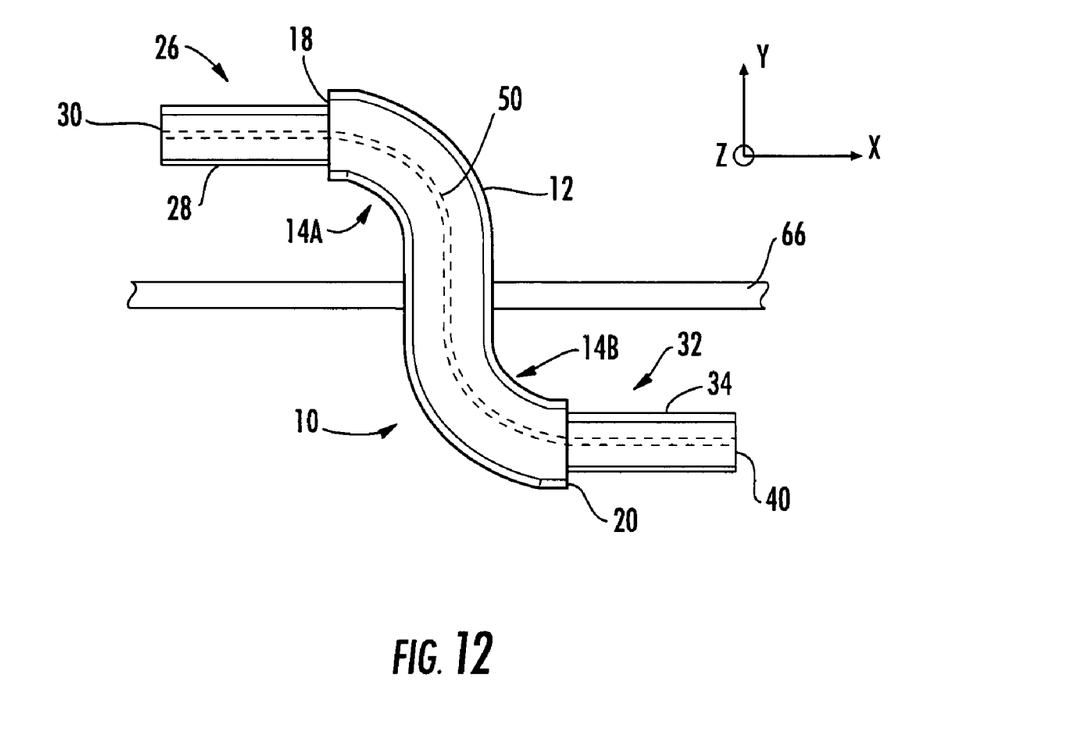
FIG. 12 is a schematic side view of an example embodiment of a Z-shaped right-angle connector assembly having two right angles, shown as passing through a circuit board.

FIG. 12 is a schematic side view of example embodiment of Z-shaped right-angle connector assembly 10 shown passing through circuit board 66. Right-angle connector assembly 10 of FIG. 12 includes a Z-shaped right-angle ferrule 12 having two right angle bends 14A and 14B. In an example embodiment, the right-angle bends 14A and 14B lie in the same Y-X plane so that connector ends 30 and 40 face in opposite directions and lie in parallel Y-Z planes, but are displaced relative to one another in the X-direction and the Y-direction, as shown. In another example embodiment, right-angle bends 14A and 14B lie in different planes (e.g., orthogonal planes) so that connector ends 30 and 40 lie in different (orthogonal) planes.

Figure 13:
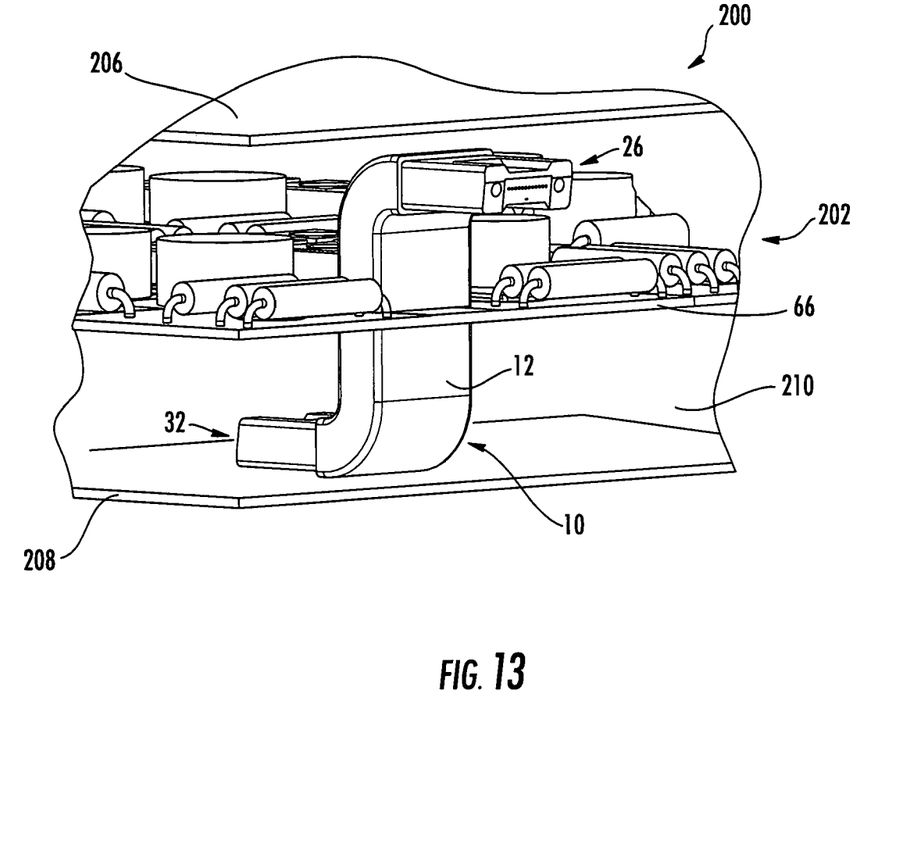
FIG. 13 is a partial cut-away perspective diagram of the Z-shaped right-angle connector assembly and circuit board of FIG. 12 as housed in a device having a cramped interior, illustrating how the right-angle connector assembly of FIG. 12 provides for a compact optical conduit in such a device.

FIG. 13 is a partial cut-away perspective diagram of the right-angle connector assembly and circuit board of FIG. 12 as housed in a device 200. Device 200 includes a housing 202 having upper and lower walls 206 and 208 that define a relatively cramped device interior 210 that includes circuit board 66 and right-angle connector assembly 10. FIG. 13 illustrates the right-angle connector assembly's ability to provide an optical-fiber conduit and interconnection in a cramped space such as that of device interior 210.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A right-angle optical-fiber connector assembly, comprising:
   a rigid ferrule having at least one right-angle bend and defining a ferrule interior and first and second ferrule ends;
   a plurality of bend-performance optical fibers that traverse the ferrule interior and that have respective first and second optical fiber ends, a bending radius $R_F$ and a minimum bending radius $R_{MIN}$ wherein $R_{MIN} \leq R_F \leq R_{MAX}$, wherein $R_{MAX}$ is the maximum fiber bending radius allowed by the ferrule interior, and wherein at least one of the optical fibers has $R_F = R_{MIN}$, and wherein at least one of the optical fibers is an outermost fiber having a bending radius $R_F$ greater than $R_{MIN}$; and
   first and second connector ends respectively located at or near the first and second ferrule ends and that respectively operably support the first and second optical fiber ends to provide external optical interconnection capability, wherein
   the rigid ferrule is an overmold formed by providing flowable material about the optical fibers.

2. The connector assembly of claim 1, wherein $R_{MIN}$ is about 2 mm.

3. The connector assembly of claim 1, further including first and second connector housings located at the first and second ferrule ends and that define the first and second connector ends.

4. The connector assembly of claim 3, wherein the first and second connector housings and said first and second connector ends define corresponding first and second connectors selected from the group of connectors comprising: FC, SC, LC, ST, MU and MTP connectors.

5. The connector assembly of claim 1, further including a circuit board optically connected to one of the connector ends.

6. The connector assembly of claim 1, wherein the ferrule includes two right-angle bends, wherein the first and second connector ends respectively face opposite directions.

7. The connector assembly of claim 1, wherein the optical fibers are each microstructured optical fibers.

8. A method of forming a right-angle connector assembly, comprising:
   providing a rigid ferrule having at least one right-angle bend and defining a ferrule interior and first and second ferrule ends;
   arranging a plurality of bend-performance optical fibers having respective first and second optical fiber ends so as to traverse the ferrule interior, the optical fibers each having respective first and second optical fiber ends, a bending radius $R_F$ and a minimum bending radius $R_{MIN}$, wherein $R_{MIN} \leq R_F \leq R_{MAX}$, wherein $R_{MAX}$ is the maximum fiber bending radius allowed by the ferrule interior, and wherein at least one of the optical fibers has $R_F = R_{MIN}$, and wherein at least one of the optical fibers is an outermost fiber having a bending radius $R_F$ greater than $R_{MIN}$; and
   attaching at least one connector end at or near at least one of the first and second ferrule ends respectively to operably support at least one of the first and second optical fiber ends to provide external optical interconnection capability, wherein
   providing the rigid ferrule comprises providing flowable material about the optical fibers.

9. The method of claim 8, wherein at least one connector housing is located at at least one of the first and second ferrule ends so as to define at least one connector ends.

10. The method of claim 8, wherein at least one connector end is formed at one of the first and second ferrule ends and optically connected to a circuit board.

11. The method of claim 8, including forming two right-angle bends in the ferrule, wherein the first and second connector ends respectively face opposite directions.

12. A right-angle optical-fiber connector assembly for connecting to a circuit board, comprising:
   a rigid ferrule having first and second ferrule ends, a ferrule interior, and at least one right-angle bend;
   a plurality of bend-performance optical fibers that traverse the ferrule interior and that have respective first and second optical fiber ends, a bending radius $R_F$ and a minimum bending radius $R_{MIN}$, wherein $R_{MIN} \leq R_F \leq R_{MAX}$, wherein $R_{MAX}$ is the maximum fiber bending radius allowed by the ferrule interior, and wherein at least one of the optical fibers has $R_F = R_{MIN}$, and wherein at least one of the optical fibers is an outermost fiber having a bending radius $R_F$ greater than $R_{MIN}$; and
   first and second connector ends respectively located at or near the first and second ferrule ends and that respectively operably support the first and second optical fiber ends, wherein at least one of the first and second connector ends is formed at one of the first and second ferrule ends respectively and adapted to optically connect to the circuit board, wherein the rigid ferrule is an overmold formed by providing flowable material about the optical fibers.

13. The connector assembly of claim 12, wherein at least one of the connector ends is defined by at least one connector housing having a retaining feature adapted to operably retain the connector end to the circuit board.

14. The connector assembly of claim 12, wherein the first and second connector ends correspond to first and second connectors selected from the group of connectors comprising: FC, SC, LC, IC, ST, MU and MTP connectors.

* * * * *